Patented Apr. 25, 1944

2,347,211

UNITED STATES PATENT OFFICE 2,347,211

COMPOSITION OF MATTER FOR USE AS SEALERS AND THE LIKE

Grant S. Merrill, St. Paul, Minn., and Gordon P. Hollingsworth, Detroit, Mich., assignors to Minnesota Mining & Manufacturing Company, St. Paul, Minn., a corporation of Delaware No Drawing. Application March 16, 1939, Serial No. 262,176

7 Claims. (Cl. 260—755)

The present invention relates to resinous and/or rubber containing materials and to methods of making the same. It has particular reference to plastic or fluid compositions, useful as sealers, i. e., useful in the sealing of seams of metal and other seams.

There are many uses for sealers in industry. Sealers are extensively used in the construction of automobiles: (a) In sealing welded seams, e. g., electric or spot-welded seams, where the roof and the floor and the upright portions of the body (sides, front and back) come together; (b) as a belt molding sealer. Many automobile bodies have a chromium or metal strip which goes approximately horizontally around the body below the windows. These strips are fastened to the body by clips and a sealer is used around these clips and the holes in the body through which they come, the function of the sealer being to keep water from getting through to the inside of the automobile; (c) to prevent water or air from coming through between the rubber and metal and rubber and glass of windshields or rear windows of automobiles.

Though the automotive industry provides one of the great uses for sealers, sealers are also used in large quantities in other industries. Sealers are used in refrigerator construction to provide air and water-tight seams where two pieces of metal come together. They are also used in sealing storage batteries. Other uses include the sealing of Pullman car windows or other railway car windows, and also, for use in building construction to provide a seal where a window glass goes into a metal or like frame (in place of the ordinary calcium carbonate-linseed oil type of putty previously used) and also to seal the cracks around window frames, door frames, etc., that is, at places where the wood or steel frame meets the brick, concrete or stone or the like, where putty-like calking compounds were previously used. Sealers of the type herein defined also have use as a calking compound in boat construction. Again, sealers of the type herein defined have been used in ice cream trucks to line the whole inside so as to keep the corrosive salt or salt water, etc., away from the metal. This same type of coating on the inside of trucks has also been employed in large beer trucks, etc. Another use of sealers which may be mentioned is in connection with coolers, such as are used in retail stores to keep soft drinks, ice cream and the like cool. Here the sealers keep the salt and melting ice away from the metal and minimize or obviate corrosion.

Heretofore, cut-back asphalts and also certain types of rubber cements were tried as sealers. They failed to be satisfactory for a number of reasons. The asphalt cut-backs would form so-called "pin-holes" and also would puff up during drying. They also "ran" badly away from the seams to which they were applied. Further, they did not dry rapidly enough to make them adaptable to commercial production operations, such as the assembly line in automobile factories. Additionally, they showed poor shock resistance in cold weather and a tendency to soften in warm weather. In short, they were quite unsatisfactory from a number of points of view.

Other materials which workers in the art have attempted to use as sealers are certain adhesive rubber cements. These materials, in common with the cut-back asphalts above mentioned, ran badly under the conditions of heat which existed during the drying operations and for this and other reasons were unsatisfactory as sealers.

Also, some asphalt emulsions were tried prior to this invention but did not provide good adhesion to materials such as metals or glass. Additionally, they cracked, formed pin-holes during drying, and had poor shock resistance in cold weather.

Another deficiency of all of these materials, including the asphalt cut-backs and cements, was that they did not possess the property of bridging small holes but instead ran through the hole, leaving the hole unsealed.

Among the objects and advantages of the present invention are: (1) the use of rubber or reclaim in such proportion as to provide toughness and shock resistance to the sealer and to improve the adhesion of the sealer at the points desired; (2) the provision of compositions having much higher precentages of solids than were employed in various of the "rubber cements" above referred to; (3) the use of limed or zinc treated rosin, or the like, with or without untreated rosin, to contribute to the adhesion or the setting properties of sealers and also to improve their toughness; (4) the control of the composition of sealers so as to give them flow resistance and at the same time the characteristic of forming a skin which, even though small bubbles may be formed to some extent in certain cases, provides a seal. Clay and/or asbestos fibre and other ingredients provide these qualities, as will hereinafter appear from the detailed description.

Further it is an object of this invention to provide sealers which are satisfactory in all important respects including freedom from shrinkage, freedom from the tendency to flow away from seams during setting, freedom from stringing (if a ribbon gun is used) or from cobwebbing (if a spray gun is used) during application, toughness and resistance to cracking or shattering after drying, i. e., when in set or solidified condition, and when low temperatures are encountered, resistance to softening or flowing under high temperatures, sufficiently rapid setting of the wet film so that the sealer will be acceptable for use in modern production methods, and properties such that the sealer will close off small openings and cracks, that is, will bridge the openings or cracks, instead of flowing through them.

The preferred compositions of this invention comprise the use of reclaimed rubber or equivalent. They also preferably contain a resin of the nature of wood rosin which has been treated with lime or zinc oxide. Clay and asbestos fibre are illustrative of additional ingredients which are advantageously employed. Also, solvents such as hydrocarbon material or distillate of controlled distillation range are contemplated.

In order to specifically illustrate the invention a number of sealer compositions will be hereinafter specifically set forth and a preferred method of making the same will be indicated.

Example 1

| | Parts |
|---|---|
| Whole tire reclaim | 288 |
| Blown asphalt | 576 |
| Limed FF wood rosin (4 parts lime by weight per 100 parts rosin) | 432 |
| Dixie clay | 1,152 |
| Short fibre asbestos | 72 |
| Odorless petroleum solvent, initial boiling point 147° F. and end boiling point 156° F., specific gravity 0.683 | 1,000 |

A suitable method for compounding the above ingredients is as follows: First, mill the reclaim on a rubber mill, e. g., an ordinary two-roll rubber mill, for about twenty minutes. This milled reclaim may then be introduced into an internal mixer, i. e., a so-called mogul mixer, or an internal mixer of the Werner-Pfleiderer type, having jacket temperature of about 180° F. After about ten minutes of further mixing, the asphalt of the above formula is added, gradually enough so as not to break up the coherency of the plastic mass. After about thirty more minutes, about one-half the clay may be added (all at once or somewhat gradually) and then after about ten additional minutes, the other half of the clay may be added in like manner. After about ten more minutes of mixing, the limed rosin is added and gradually worked into the mass. After about forty more minutes, during which mixing is continued, the asbestos fibre is added and the batch is mixed and is cooled by running cooling water through the jacket of the mixer. This mixing and cooling may, illustratively, continue for about one hour and ten minutes, during which time the temperature is brought down to about 145° F. or lower. Then the petroleum solvent is added, and the addition is gradual enough so that the coherency of the batch is not broken up or injured. After two hours and forty more minutes of mixing, during the first half or two-thirds of which the solvent is being gradually added, the mix is completed and is ready for sampling or packaging.

At this point the batch is customarily tested for viscosity and, if found to be too heavy or of too high a viscosity, more solvent is added to it so as to reduce the viscosity as desired.

The above method of preparation, while a preferred one, is only illustrative and the specific provisions given above may be substantially varied or departed from while still obtaining a product of substantially the same characteristics. However, it is important where a liquid is being added to a stiff plastic mass, or where a soft material is being added to a stiffer material, to see to it that the addition is gradual enough so that the coherency of the mass is not broken up and in order to keep the batch stiff enough to exert a mechanical action on the materials being added so that a uniform or homogeneous batch will result.

A cement of the type illustrated in the above example, has important utility as a sealer of high quality where an odorless type sealer is desired and has been used with very satisfactory results in refrigerator sealing and for other sealing purposes.

Example 2

| | | |
|---|---|---|
| Whole tire reclaim | lbs | 300 |
| Blown asphalt | lbs | 600 |
| Limed FF wood rosin (6 to 7 lbs. of lime per 100 lbs. wood rosin) | lbs | 450 |
| Dixie clay | lbs | 675 |
| Short asbestos fibre | lbs | 75 |
| Petroleum solvent of 140–210° F. distillation range | gals | 30 |
| Petroleum solvent of 308–365° F. distillation range | gals | 215 |

The composition of Example 2 may be compounded in generally the manner described in connection with Example 1, or by any other suitable method. It is not necessary, however, to cool the mix to as low a temperature before adding the solvent in Example 2 as was recommended in connection with Example 1.

It will be noted that a substantially smaller amount of Dixie clay is employed in Example 2 than in Example 1. Furthermore, this sealer has a much longer working life than the sealer of Example 1 and is adapted for use where uses or production conditions make a longer working life desirable.

Example 3

| | Lbs. |
|---|---|
| Whole tire reclaim | 642 |
| Limed FF wood rosin (4 lbs. lime per 100 lbs. wood rosin) | 481 |
| Dixie clay | 1,284 |
| Oleum spirits (petroleum distillation having a boiling range of 150 to 215° C.) | 41.4 |
| Petroleum solvent (distillation range 148 to 210° F.) | 152.4 |

The general mode of compounding ingredients given in connection with Example 1 may also be employed in connection with the sealer of Example 3, which may be described as a rubber dough sealer. As described above in connection with Example 1, caution should be exercised where liquid is being added to a solid or stiff material to see that this is done gradually enough so that the mass will not be broken up, that is, so its coherency will not be destroyed. This principle should also be followed where a relatively soft material is being added to a firm or stiff material.

The composition of Example 3 is especially adapted for use as sealer in the sealing of Pullman and railway coach windows, being used between the glass and the metal frame. It is also useful in the glazing of metal sash, for example in greenhouses and the like, and other uses where it is desired to provide an air-tight and water-tight union between the pane of glass and metal, wood or other type of sash.

The composition of Example 3 is of a rather heavy or stiff consistency and is in the nature of a dough, rather than a fluid.

Example 4

| Ingredient | | |
|---|---|---|
| Red inner tube reclaim | lbs | 600 |
| Limed FF wood rosin (4 lbs. of lime per 100 lbs. of wood rosin) | lbs | 600 |
| Dixie clay | lbs | 2,100 |
| Carbon black | lbs | 1.4 |
| Red iron oxide | lbs | 120 |
| Oleum spirits (petroleum distillate of 150° to 215° C., 302° to 419° F., boiling range) | lbs | 30 |
| Petroleum solvent (distillation range 140 to 210° F.) | gals | 148 |

This formula is somewhat comparable to that of Example 3 but differs in a number of its characteristics and, of course, differs in respect to color. It will be noted that the Dixie clay employed is present in quite a different proportion in the composition of Example 4 than in that of Example 3.

The technique of compounding the composition of Example 4 may be so much like that of Example 3 that separate detailed discussion seems unnecessary.

Example 5

| Ingredient | | |
|---|---|---|
| Milled rubber base | lbs | 871 |
| Limed rosin—a color grade of M wood rosin—acid number of about 75 to 80 and having about 4 lbs. lime per 100 lbs. rosin | lbs | 540 |
| Clay, e. g., of the kaolin type | lbs | 1,266 |
| Oleum spirits 150° to 210° C., 302° to 410° F., distillation range | gals | 133 |

The miller rubber base of Example 5 is made up as follows:

| Ingredient | Lbs. |
|---|---|
| Light gray inner tube reclaim | 108 |
| Titanium oxide | 27 |
| Metallic flake aluminum pigment | 21.5 |
| Clay, e. g., of the kaolin type | 61.5 |

The last mentioned ingredients, when milled together for example on a two-roll rubber mill, make up the milled rubber base specified in Example 5.

The composition of Example 5 is somewhat comparable to that of the two preceding examples but a number of important distinctions will be readily apparent.

Example 6

| Ingredient | | |
|---|---|---|
| Red inner tube reclaim | lbs | 400 |
| Limed FF wood rosin (4 lbs. lime per 100 lbs. rosin) | lbs | 600 |
| Finely divided kaolin | lbs | 100 |
| Short fibre asbestos | lbs | 260 |
| A petroleum hydrocarbon material having a distillation range of 90° to 120° C., 194° to 248° F | gals | 160 |

The composition of this example, while having utility for purposes similar to that of the compositions of the three preceding formulas, e. g., in the glazing of windows as a calking compound, etc., is of a much thinner viscosity and lends itself conveniently to mechanical application. It has important utility in connection with unprimed wood sash and has properties superior to those of the standard type primeless putty previously used. The composition of Example 6 retains its toughness and plasticity much longer than ordinary oil-base putty and its adhesion to unprimed wood and sash is very much better than ordinary oil-base putty after a long exposure to weathering, e. g., after a year or more.

A further advantage of this type of material in connection with its use as a glazing compound is that the technique of using this material can be acquired much more quickly than can the technique of doing a good glazing job with ordinary oil-base putty.

Example 7

| Ingredient | | |
|---|---|---|
| Red inner tube reclaim | lbs | 810 |
| Whole tire reclaim | lbs | 270 |
| Limed FF wood rosin (6 to 7 lbs. lime per 100 lbs. wood rosin) | lbs | 180 |
| FF wood rosin treated with 2% lime and 4% zinc oxide | lbs | 540 |
| Denatured alcohol | lbs | 54 |
| Petroleum hydrocarbon solvent—distillation range 147 to 156° F., specific gravity 0.63 | gals | 295 |

This composition, among its various uses as a sealer, has been used to advantage as a so-called weatherstrip cement, i. e., to provide a seal between rubber and glass and between rubber and metal; a sealing operation, for which the composition of Example 7 is especially suited, is encountered for example, around the windshields and rear windows of automobile bodies.

The treated resin and also the special solvent employed here are noteworthy ingredients of the composition of Example 7. The alcohol is also a noteworthy ingredient.

Example 8

| Ingredient | | |
|---|---|---|
| Whole tire reclaim | lbs | 206 |
| Red inner tube reclaim | lbs | 1,006 |
| WW gum rosin | lbs | 650 |
| Petroleum solvent—distillation range of 140 to 210° F | gals | 215 |

It will be noted that this formula is much simpler than various of the preceding formulae in that it consists solely of reclaim, rosin and a solvent. It is a relatively soft and sticky sealer and has utility for sealer uses where material of a soft character having adhesive properties is desired.

Example 9

| Ingredient | | |
|---|---|---|
| Red inner tube reclaim | lbs | 810 |
| Whole tire reclaim | lbs | 270 |
| Limed FF wood rosin (6 to 7 lbs. lime per 100 lbs. wood rosin) | lbs | 180 |
| FF wood rosin treated with 2% lime and 4% zinc oxide | lbs | 540 |
| Amyl acetate | lbs | 54 |
| Petroleum solvent—distillation range of 140 to 210° F | gals | 350 |

As will be readily seen, this formula is very similar to the composition of Example 7 but differs from the latter in that amyl acetate is employed and denatured alcohol is not employed and also in respect to a different hydrocarbon solvent.

Example 10

| Ingredient | | |
|---|---|---|
| Rubber base | lbs | 860 |
| FF wood rosin | lbs | 209 |
| Limed rosin (4 lbs. lime per 100 lbs. rosin) | lbs | 288 |
| Opalwax #10—a synthetic wax comparable to carnauba wax | lbs | 9 |
| Dixie clay | lbs | 775 |
| Oleum spirits—distillation range of 150 to 215° C., 302° to 419° F | gals | 16 |
| Petroleum solvent—distillation range 140 to 210° F | gals | 210 |

The rubber base of the composition of Example 10 is made up as follows:

| | Lbs. |
|---|---|
| Gray inner tube reclaim | 62.5 |
| Whole tire reclaim | 96.25 |
| Milled latex crepe | 6.75 |
| Whiting | 13.5 |
| Zinc oxide | 30.5 |
| Carbon black | 5.5 |

The last mentioned ingredients may be milled together on an ordinary rubber mill and then the same may be transferred to an internal mixer of the Werner-Pfleiderer type above referred to, and mixed with the other ingredients of Example 10.

Compared with the composition of Example 7, the last mentioned composition contains treated rosin with a much higher acid number, and also, contains the Opalwax (which may be replaced by such waxes as carnauba wax) to give the composition false body, that is, greater stiffness, and also an even somewhat higher waterproofness.

While the utility of compositions above described will be generally understood from the discussion given, the composition of Example 2 and compositions of comparable type, have been and presently are being used as a roof and floor sealer in the construction of auto bodies.

While the importance of certain ingredients of sealers as hereinabove disclosed are described above to some extent, further discussion on these points will be helpful in bringing out important features.

The reclaims or reclaimed rubber compositions used herein are preferably alkali-processed reclaims.

The use of rubber in proportions of the order illustrated is desired in order to produce a tough and shock resistant sealer which has good adhesion when mixed with resinous material. It will be seen that a number of our preferred sealers are illustrated which have a solids content of the order of 50% or more of the sealer. In fact, this invention includes sealers having a solids content of much more than 50%. Example 1 illustrates a sealer having a solids content of the order of 70 to 75%, while other of the examples, e. g., Example 3 illustrates a still higher percent of solids. Sealers of this type have a low shrinkage and hence function advantageously for the purpose for which they are employed, whereas, many materials previously employed did not really serve to seal the seams of openings which they were intended to seal because of their shrinkage. In this connection, a sealer of the types shown in Examples 7 and 9 are noteworthy in that they have a high solids content for the high fluidity which they possess. This is believed to be due to an important extent to the alcohol employed in Example 7 and the amyl acetate employed in Example 9.

The use of materials such as limed and/or zinc treated rosin or the like, as herein illustrated, contributes to the adhesion of the sealer to steel or other metals and to glass, as well as other materials, and also causes the sealer to set sufficiently rapidly so that it will be adaptable for use in industry, for example in the production line in automotive factories. This material also contributes to the toughness of the sealer and is otherwise much superior to the use of ordinary untreated rosin alone for these purposes.

The use of a clay such as Dixie clay, is mentioned by way of illustration in several of the examples given above. Dixie clay may be described as a finely divided kaolin-type clay. It is of relatively low colloidal character as compared with such materials as bentonite, though it is sufficiently finely divided so that about 98% thereof will pass a 325 mesh screen. This particular type of clay is, of course, only illustrative and, while a preferred material, may be replaced by other classes of materials of generally comparable character or similar particle size. The use of this type of material in our sealers reduces the tendency of the sealer to shrink away from the metal or other parts upon setting and also contributes to the toughness and the flow resistance of the sealer. It serves to reduce the tendency of the sealer to flow both before and after setting of the same. It further helps to make the sealer set more rapidly and, what is a very important point, at the same time tends to form a skin which, even though some bubbles may be formed during setting, provides a substantially fluid-tight seal.

Asbestos fibre contributes to the function of the clay in reducing the tendency of the sealer to run, both in the wet state and, under the influence of heat following setting. The asbestos fibre also aids in the bridging of holes and cracks.

Zinc oxide and such materials, when used with the rosin, increase the toughness of the final set film of sealer and also improve the adhesion of the sealer to surfaces such as those of iron, aluminum, or other metal parts as well as to glass, synthetic resins and enamels, etc.

Crude rubber, where used, contributes to the false body or stiffness of the sealer and also contributes to the toughness of the dried film of sealer. The use of crude rubber is illustrated by the milled latex crepe of Example 10.

The "Opalwax" mentioned in Example 10 is a synthetic wax made by E. I. du Pont de Nemours and Company and may be referred to as a sort of synthetic carnauba wax. Carnauba wax itself may be used instead of this synthetic wax. These waxes, when used in sealers in generally the proportions shown, have the property of jelling the sealer or giving it buttery characteristics or body. This material, as well as the limed rosin or equivalent, the clay, and/or the asbestos fibre, eliminates stringiness of the sealer so that it is easier to apply to desired surfaces, cracks or seams and can be applied without the formation of so-called "cob-webs" or strings.

Variations in the ratio of rubber and reclaim to asphalt from those illustrated hereinabove, for example from those illustrated in Example 1, are contemplated. In fact, very good sealers have been made which contain a very much lower amount of rubber, e. g., latex crepe, in relation to the amount of asphalt used, than that illustrated in Example 1. However, this subject matter will be more fully described and claimed in a separate application.

While the ratio of rubber or reclaim to asphalt may be increased over that illustrated, with satisfactory results, this is normally not desired for practical reasons. However, the ratio of reclaim to asphalt may be increased substantially over that illustrated so long as the tackiness, adhesion and workability of the sealer are satisfactory.

Another important feature of this case as distinguished from types of materials which heretofore have been tried as sealers, instead of using a high limed rosin, e. g., one having relatively low acid number of the order of 35, we have found that it is preferable to use a rosin which has not been so heavily limed, e. g., one having the acid number of the order of 75, as illustrated in Example 1. While a high limed rosin provides toughness to the sealer, just as good toughness is obtained by using a low-limed rosin as illustrated, plus clay. In addition, the viscosity of the sealer made with the low-lined rosin and clay does not change as much with temperature as in the case of the use of the high limed rosin, and you also get better ageing of the sealer, i. e., the viscosity of the sealer during storage increases less.

While the invention has been hereindescribed and illustrated in terms of a number of specific examples, it will be understood that all embodiments described in the specification and those comprehended within the scope of the appended claims are contemplated.

What we claim is:

1. A composition of matter having utility as a sealer which comprises reclaimed rubber, asphalt, a mixture of rosin and a rosin soap which mixture has an acid number much lower than that of untreated rosin, a finely divided clay, and a material of the nature of short fibre asbestos, said asphalt being present to the extent by weight of at least about twice that of said reclaimed rubber, said mixture of rosin and rosin soap being present to a greater extent by weight than said reclaimed rubber and said clay being present to a greater extent than said reclaimed rubber, the materials named being disseminated in a volatile solvent to provide a spreadable, viscous mass at room temperatures.

2. A composition as described in claim 1 further characterized in that the solvent employed is composed primarily of hydrocarbons having a distillation range of less than 50° F.

3. A composition of matter as described in claim 1 further characterized in that it is substantially of the character resulting where the said solvent comprises a hydrocarbon liquid boiling within the range of 147° to 156° F.

4. A composition of matter having utility as a sealer and having good adhesion to metal surfaces which comprises rubber, asphalt, and a rubber softener comprising rosin of reduced acid number, said rubber being present in substantial but minor percentage by weight in relation to the combined weight of said asphalt and said rubber softener, and said rubber softener being present in substantial quantity in relation to said rubber but not being present in greater proportion than approximately twice that of said rubber, and the balance of the solids content of said composition being made up largely of a filler, the resulting material being dispersed in a volatile vehicle to provide a spreadable, viscous mass at room temperatures.

5. A composition of matter having use as a sealer and/or an anti-drumming agent for metals which comprises rubber, an asphaltic bitumen and a resinous mixture comprising rosin, said resinous mixture having an acid number much lower than that of untreated rosin and serving as a softener for said rubber, and a filler comprising finely divided clay, said rubber being present in substantial but minor proportion in relation to the combined weight of the aforementioned ingredients as a whole, said resinous mixture being present in substantial proportion in relation to said rubber but in smaller proportion than said bitumen, and said filler making up not more than about one-half the total solids content of said composition but being present in at least approximately as great a proportion by weight as said bitumen, the materials named being disseminated in a volatile vehicle to provide a spreadable viscous mass at room temperatures.

6. A composition of matter having utility as a sealer which comprises rubber, asphalt, a resinous material comprising rosin and a rosin soap which material has an acid number much lower than that of untreated rosin, a finely divided clay, and a material of the nature of short fiber asbestos, said asphalt being present to the extent by weight of at least about twice that of said rubber, said resinous material being present to a greater extent by weight than said rubber, and said clay being present to a greater extent than said rubber, the materials named being disseminated in a volatile vehicle to provide a spreadable viscous mass at room temperatures.

7. A composition of matter having utility as a sealer and having good adhesion to smooth metal surfaces which comprises rubber, asphalt, a resinous mixture comprising rosin and a resin soap which mixture has an acid number much lower than that of untreated rosin, a powdered filler including clay, and a fibrous material of the nature of short fiber asbestos, said rubber being present in substantial but minor proportion in relation to the combined weight of the aforementioned materials, said asphalt being present to an extent by weight at least approximately as great as that of said rubber, said resinous mixture comprising rosin and soap being present to an extent at least approximately as great as that of said rubber, and said powdered filler being present to a greater extent than said rubber but not making up more than about half of the total weight of the above named materials, the materials named being disseminated in a volatile vehicle to provide a spreadable viscous mass at room temperatures.

GRANT S. MERRILL.
GORDON P. HOLLINGSWORTH.